(12) United States Patent
Tsinman et al.

(10) Patent No.: US 8,156,078 B2
(45) Date of Patent: Apr. 10, 2012

(54) INTELLIGENT CLIENT ARCHITECTURE COMPUTER SYSTEM AND METHOD

(75) Inventors: Igor Tsinman, Sharon, MA (US); Jamie Mazur, S. Glastonbury, CT (US); Robert E. McGill, Rumson, NJ (US)

(73) Assignee: Landmark Technology Partners, Inc., Sea Bright, NJ (US)

( * ) Notice: Subject to any disclaimer, the term of this patent is extended or adjusted under 35 U.S.C. 154(b) by 336 days.

(21) Appl. No.: 12/421,800

(22) Filed: Apr. 10, 2009

(65) Prior Publication Data

US 2009/0292709 A1 Nov. 26, 2009

Related U.S. Application Data

(62) Division of application No. 10/974,845, filed on Oct. 28, 2004, now Pat. No. 7,536,421.

(60) Provisional application No. 60/515,695, filed on Oct. 31, 2003.

(51) Int. Cl.
*G06F 17/40* (2006.01)
(52) U.S. Cl. ...................................................... 707/622
(58) Field of Classification Search ........................ None
See application file for complete search history.

(56) References Cited

U.S. PATENT DOCUMENTS

| | | | |
|---|---|---|---|
| 5,737,601 A * | 4/1998 | Jain et al. ...................... | 707/622 |
| 5,787,262 A * | 7/1998 | Shakib et al. ................. | 709/205 |
| 5,924,094 A | 7/1999 | Sutter | |
| 5,943,691 A * | 8/1999 | Wallace et al. ............... | 711/172 |
| 6,049,664 A | 4/2000 | Dale et al. | |
| 6,272,673 B1 | 8/2001 | Dale et al. | |
| 6,356,980 B1 * | 3/2002 | Arimilli et al. ............... | 711/138 |
| 6,393,434 B1 | 5/2002 | Huang et al. | |
| 6,405,220 B1 | 6/2002 | Brodersen et al. | |
| 6,446,092 B1 | 9/2002 | Sutter | |
| 6,513,059 B1 | 1/2003 | Gupta et al. | |
| 6,546,554 B1 | 4/2003 | Schmidt et al. | |
| 6,615,253 B1 | 9/2003 | Bowman-Amuah | |
| 6,636,900 B2 | 10/2003 | Abdelnur | |
| 6,640,238 B1 | 10/2003 | Bowman-Amuah | |
| 6,745,303 B2 | 6/2004 | Watanabe | |
| 6,789,077 B1 | 9/2004 | Slaughter et al. | |
| 6,810,405 B1 | 10/2004 | LaRue et al. | |
| 6,910,052 B2 | 6/2005 | Gates et al. | |
| 6,922,685 B2 | 7/2005 | Greene et al. | |
| 7,003,531 B2 | 2/2006 | Holenstein et al. | |
| 7,222,139 B2 * | 5/2007 | Mau .............................. | 707/622 |
| 7,231,397 B2 | 6/2007 | Madhavarapu et al. | |
| 7,263,528 B2 * | 8/2007 | Haff et al. ..................... | 707/622 |

(Continued)

*Primary Examiner* — Hung Q Pham
*Assistant Examiner* — Hubert Cheung
(74) *Attorney, Agent, or Firm* — J.A. Lindeman & Co., PLLC

(57) ABSTRACT

A collision detection and data synchronization mechanism operates to expand the speed and capability of distributed applications. The execution environment employs collision detection and data synchronization to distribute data objects to appropriate network nodes to support local processing. The collision detection and data synchronization mechanism defines the set of processes and algorithms used to track distributed data objects and to manage changes to the distributed objects throughout a network of intelligent computing devices. Data and code are distributed to local computing devices necessitating tracking and synchronizing updates. The system and method ensures that data updates received during the course of a local transaction do not unwillingly affect the results of other transactions by notifying the local computing devices of changes to the data that are subject of the transaction. These conflicts are then resolved in the applications, and notification of the resolution is sent to the remaining intelligent computing devices.

15 Claims, 12 Drawing Sheets

U.S. PATENT DOCUMENTS

| | | |
|---|---|---|
| 2002/0116403 A1 | 8/2002 | Weedon |
| 2002/0152231 A1 | 10/2002 | Silva-Craig et al. |
| 2002/0174191 A1 | 11/2002 | Robertson et al. |
| 2004/0143644 A1 | 7/2004 | Berton et al. |
| 2007/0083715 A1* | 4/2007 | Vanderpool .................... 711/141 |
| 2009/0204643 A1* | 8/2009 | Deffler .......................... 707/201 |

* cited by examiner

INTELLIGENT CLIENT ARCHITECTURE COMPUTER SYSTEM AND METHOD

FIELD OF THE INVENTION

The invention relates generally to distributed processing computer systems. More particularly, the invention relates to systems and methods for distributed application management and soft object referencing in distributed processing systems to allocate data objects to network nodes to support local processing.

BACKGROUND OF THE INVENTION

In the past, there have been three major application architectures that have been used to build and deploy software that supports end-user processes. This is in contrast to lower level software that supports hardware and software processes such as operating systems. These three architectures have closely mirrored the evolution of the hardware environment. First, in the beginning of the computer age, hardware was centralized, expensive and very tightly controlled. This was typified by the mainframe computer with optional dedicated terminals to support end users. A monolithic or host-based application architecture evolved to build software in the mainframe environment, with virtually all computer tasks managed by the central mainframe computer. This application architecture was simple to manage as it was all in one place, but had shortcomings in its ability to support complex processes and in its ability to grow and expand to support larger user populations.

Second, with the advent of the networked personal computer (PC), the ability to use a PC to render graphic images and Windows® spawned a new application architecture called client-server computing. The key feature of this architecture was the delegation of some portion of the application computer tasks to the client computer. The distribution of tasks between the client and the server was based on their technical nature, with presentation/graphic tasks sent to the client, database tasks delegated to the central server, and application logic existing in either place or on a middle tier called the application server. Client-server computing was a huge improvement over past architectures in that it supported more complex processes with more intuitive interfaces and was better able to grow to support large user populations by distributing the processing and communications activities load across many computers.

Third, with the broad adoption of the Internet, a new style of application architecture emerged called n-Tier (or sometimes "thin-client") that was expressly designed to take advantage of browsers, Internet servers, and Internet standards. Thin-client applications are designed to be small, so that the data processing is performed predominantly on the server, rather than on the client. N-Tier application architecture refers to applications that are broken into different layers or tiers, where modifications to the application may be made by altering or replacing a particular tier, rather than by replacing the entire application. The n-Tier architecture is similar to client-server computing in that computer tasks are distributed between a central server complex of computers and a client computer (typically a PC). It is different in that much of the work that the client computer performed in the client-server model is migrated back to the server. Clients are left with only a portion of the presentation logic, which runs inside of a browser or similar presentation program. This architecture had two important improvements over client-server computing. It requires no installed software at the client layer, which cuts application management costs dramatically, and it allows ubiquitous access to applications. Users may now access their software from wherever the Internet takes them. The trade-off for these improvements is that in re-centralizing the computer tasks, this architecture is much slower than a traditional client-server model, and it provides weaker security and a less intuitive user interface. The result is that n-Tier applications are sufficient for simple, non-mission critical applications, but are unworkable for many of the most important software needs in today's economy. Prior attempts to overcome these challenges have fallen short in suitably addressing both concerns simultaneously. That is, there is a lack of a suitable architecture that may centralize applications while simultaneously providing an agile response, sufficient security, and an intuitive user interface.

For example, U.S. Pat. Nos. 5,924,094 and 6,446,092 appear to disclose independent distributed database systems where all nodes are peers, and no node acts as a server for the others. The systems do not distinguish between master and slave sites since each site stores all and only the data required to work off-line with local data. All application transactions are made against the local database. Sites sharing the same data synchronize their changes periodically in the background. In these systems, there are no on-line or distributed application transactions because all application transactions are local. Users employ local databases to gain performance speed. However, the '094 and '092 patents fail to disclose means by which application programs may be distributed to client devices to enable sufficient autonomy and computing capability to complete entire business transactions while simultaneously providing a secure means with which to conduct the transactions.

Additionally, U.S. Pat. Nos. 6,049,664 and 6,272,673 appear to disclose a mechanism for creating a software application for execution on a network that has multiple tiers. The mechanism includes means for specifying application components, which allows an application component to be assigned to execute on any of the tiers of the network. The mechanism also includes means for associating the application components with a hypertext page. The components are then executed in response to requests for the hypertext page. The '664 patent and the '673 patent, however, fail to disclose means with which to suitably distribute applications based upon the boundaries of a required transaction. Instead, the '664 patent and the '673 patent perform a conventional thin client distribution assignment to a client based upon the type of task being performed.

U.S. Pat. No. 6,636,900 is another example of executing distributed objects over a network. The '900 patent develops an application using object oriented code to utilize objects that are self contained application components. Each object of the application is distributed over a network. An application process may request an application object from a local or a remote network location using the address of the object, the name of the object, and any input values. If the requested object is not on the local computer, the computer on which the requested object resides receives the name of the object, executes the object using the input values, generates an output value of the object, and sends the output value to the requesting computer. The output value is then used in the running application. Thus, the object execution is remote, and the user of the requesting computer is given no indication of this remote operation. While the '900 patent employs a distributed environment, it fails to disclose means for distributed applications that are transferred to the client devices, executed, and then removed. The apparatus and method of the '900 patent provides load balancing of the application components over the network, but fails to disclose means for receiving executable applications on remote or periodically connected devices.

None of the previous architectures adequately provide the ubiquity of n-Tier applications together with the usability and sophistication of a client-server system. What is needed is a new type of architecture that distributes centralized applications while simultaneously providing agile client-side responses, sufficient security, and an intuitive user interface.

SUMMARY OF THE INVENTION

The present invention relates to systems and methods for distributed application management and soft object referencing in distributed processing systems. The present invention provides a simple, powerful, and elegant manner in which to distribute computer resources in a networked environment using distributed application management. Distributed application management is a manner of distributing tasks between computers in a network that augments client and server technologies with core services necessary to partition data management tasks. Unlike the client-server and n-Tier architectures where tasks are dispatched to a computer based on the technical type of task (e.g., database, presentation, application logic, etc.), in the distributed application management environment of the present invention, tasks are distributed based upon the boundaries of a particular business transaction. For example, if an application must execute a series of business rules, data reads, writes, updates, and presentation rendering tasks to complete the business transaction, such as applying a check to an open accounts payable, then all of these tasks are dispatched to the computer supporting that user. That is, the PC or client device operated by the user receives all the software to execute the transaction. This distributed application management frees the central server computers from having to manage the different aspects of this business transaction until it is completed and reported back to the central servers as completed. Of course, a business transaction may be any communicative action or activity involving two parties or things that reciprocally affect or influence each other and is not limited to a commercial exchange, transfer of goods, services, or funds.

The distributed application management of the present invention can temporarily distribute the entire application necessary to complete the business transaction to the client device. This distribution scheme and architecture allows the system to use the client-side computing power to manipulate the application and data in ways that would be resource-prohibitive if a shared server resource were used to accomplish these tasks. Transaction management, caching, and manipulation of business objects may be performed independently on the client, while persistence, synchronization, and query execution may take place on the server. Tasks that should be performed on the client are performed on the client, and tasks that should be performed on the server are performed on the server. This delineation provides a tremendous improvement in the performance and flexibility of Internet and other networked applications.

For example, the present invention may employ client-side computer power to perform language translation, voice recognition, integrated telephony, or rules-based data analysis. Additionally, the native processing power of a dedicated client device may be used to present a "rich client" that supports rapid and intuitive end user interaction with the application.

There are a number of complexities in managing this intelligent client architecture application once it is distributed. The data that is moved to the client must be tracked or registered by a central server resource so that updates made by other end-users (clients) can be replicated to each client that is managing and working with this data. The ability to reconcile conflicting updates to data items by multiple client devices must be adequately supported. The ability to manage and transform data between multiple data formats (relational, XML, object-based, etc.) is necessary to allow for the long term persistence, transport, and local manipulation of data. Finally, the ability to manage data objects transported to the client must be supported.

In order to address these issues, the implementation of a model driven application generation tool is needed. Because the problems created by distributing an application are significant and require a large body of software code to solve, the application generation tool of the present invention automates the creation of much of the required application code.

The distributed application management innovation of the present invention organizes computer tasks across networked computers and intelligent devices. Additionally, the present invention demonstrates specific methods for registering distributed data, resolving conflicting data updates, transforming data formats, and automating the software development process. The unique combination of these methods and a novel approach to task distribution are used to allocate data objects to network nodes to support local processing by efficiently determining the data that are needed to support transactions and local processing and by effectively synchronizing data transfers and performing collision detection on distributed processing systems to ensure the integrity of the exchanged data.

Computing devices today may be linked through a mixture of private and public networks, including the Internet. As such, the user input, the code, and the data on which the code must operate may reside on different computer devices. In order to accomplish useful work, the user input, the code, and the data are combined on a centrally located computer device, such as a server, and the results of the work performed on this central computer device are then sent to the end-user. This centralized process, while effective for some types of work, suffers from bottlenecks on the centralized device and poor performance for complex, data intensive processes or applications.

The present invention can include an application development tool and execution environment (architecture) that supports a new class of software applications designed to run on the Internet and other public networks, including wireless and periodically connected devices. This class of software built on the platform of the present invention is significantly different from conventional classes of software available today. Applications developed on the platform of the present invention may be more quickly and easily authored and developed, run faster, and possess a friendlier user interface than conventional applications, resulting in a significantly lower total cost of ownership.

In order to provide the lower costs and ubiquity of n-Tier applications, together with the usability and sophistication of client-server environments, the present invention employs Intelligent Client Architecture (ICA). With ICA, all applications may be built with Internet standards, deployed over commodity hardware and software, and distributed through the Internet or other similar networks. ICA combines the usability of rich-client applications with the portability, maintainability, and interoperability of thin-clients. By utilizing ICA, it is now possible to migrate applications out of the high cost proprietary hardware in dedicated data centers into low cost hardware/software running in shared data centers located at strategic points on the Internet. Applications that today support factories, warehouses, sales branches, and back offices will migrate from a client-server design running on in-house hardware and in-house networks to an ICA design running on public networks and shared data centers.

The invention can utilize a distributed management scheme with soft object references to capitalize upon the inherent efficiencies in local application processing while taking benefit of the power of larger server systems. The invention can allow the client and the server to cooperatively manage data, thereby blending the robust transaction capabilities, security and throughput associated with applications behind a firewall with the ubiquity, management simplicity, and device independence of n-tier architectures. ICA shifts a substantial portion of the data and processing logic to the client tier by segmenting applications based on the business transaction to be performed, resulting in outstanding response time, reduced network traffic, and a foundation for a rich-client interface.

BRIEF DESCRIPTION OF THE DRAWINGS

The above-mentioned and other features and objects of this invention and the manner of attaining them will become more apparent, and the invention itself will be better understood by reference to the following description of embodiments of the invention taken in conjunction with the accompanying figures where.

DETAILED DESCRIPTION OF THE INVENTION

Figure 1:
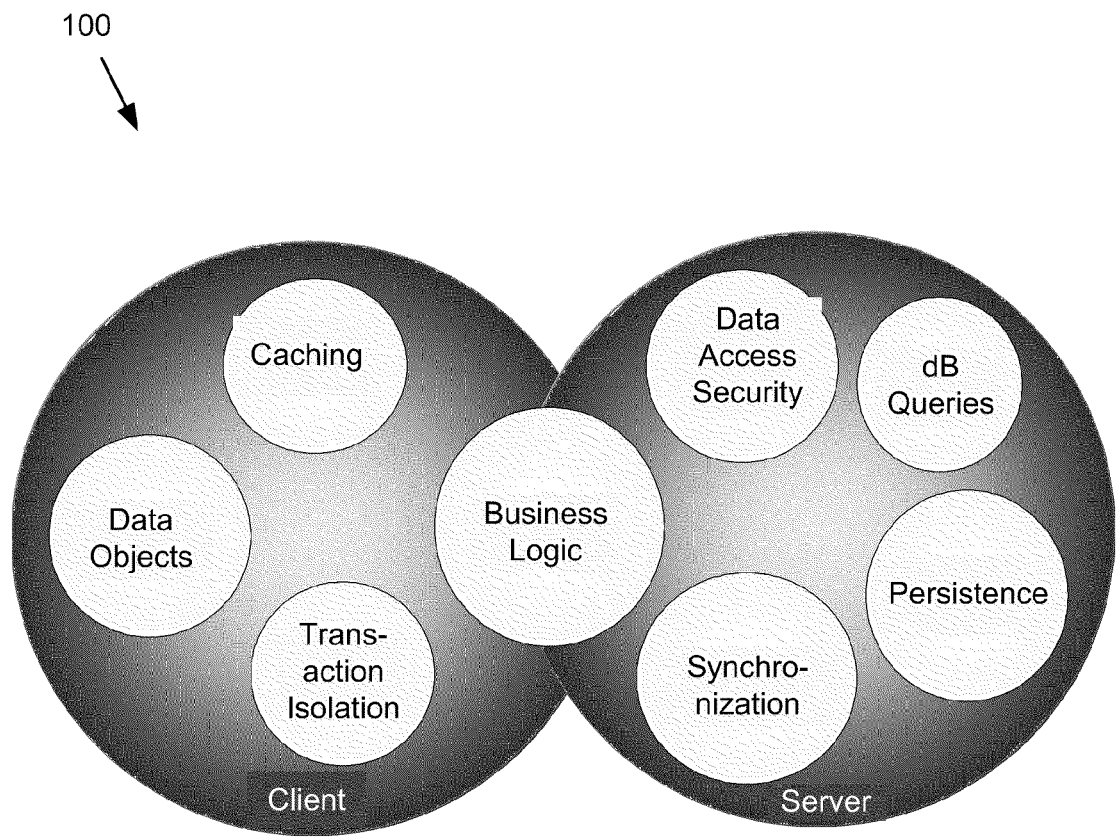
FIG. 1 is an illustration of a distributed computer network and the data requiring collision detection and data synchronization.

The invention is described in detail with particular reference to certain preferred embodiments, but within the spirit and scope of the invention, it is not limited to such embodiments. It will be apparent to those of skill in the art that various features, variations, and modifications can be included or excluded, within the limits defined by the claims and the requirements of a particular use.

The following exemplary embodiment describes the data distribution and management process of the present invention in the context of a client-server business application use case. However, it should be understood that the present invention may also be used in embedded computing, grid computing, and other data and application architectures.

The present invention extends the functionality of current client-server architectures as well as those thin-client and n-Tier distributed computer applications by distributing data objects to the proper network nodes to support local processing. Once distributed, the present invention manages the distributed data and its updates by employing collision detection and data synchronization methods to track the distributed objects and manage changes to the distributed objects throughout a network of intelligent computing devices. This has many advantages over prior assemblies such as those providing simple client-server interactions, because the data objects distributed by the present invention significantly reduce the computing overhead required at the server while providing improved security and an intuitive user interface with which to utilize new applications.

These new applications are built on a new Intelligent Client Architecture (ICA), which is a fundamentally different approach to distributing computer tasks between networked computers. Intelligent Client Architecture applications organize computer tasks around transaction boundaries and push the bulk of the computer tasks to the edge (or client) of the network. In so doing, they make better use of the hardware resources at the client and provide a commodity hardware/software implementation at all levels of the network. The system and method of the present invention utilizes a software product to build Intelligent Client applications. The software product is based on two significant design innovations that enable these improvements: soft object referencing and distributed application management.

Distributed Application Management

A powerful driver of Intelligent Computer Architecture is the migration to wireless and periodically connected devices. Because these devices are not continually connected to the Internet, they require the ability to operate in both connected and disconnected modes. The present invention naturally distributes the application and data to efficiently support and enable processes on these devices in both connected and disconnected modes within a network of computer devices. Applications using intelligent computer architecture of the present invention may be built for PCs as well as extending to cell phones, portable digital assistants (PDAs), hand-held communications devices, automobiles, and other embedded devices.

In order to accomplish useful work with these devices, the computer devices require both computer instructions ("code" and user input) and data on which those instructions operate. In a non-networked environment, when a computing device contains both the code and the data on a permanent basis, it is a relatively simple matter to complete useful work as the data and the code and the user input are all permanently stored on the same device.

When the code and the data are physically separate, data and code can be distributed to the local computer devices, but this then creates the challenge of tracking and synchronizing updates to all of this distributed data. The system and method of the present invention provides collision detection and synchronization mechanisms to effectively and efficiently track and synchronize updates, thereby allowing the distribution of data and applications that previously had to be centrally housed and managed. This, in turn, makes automated processes and applications faster, more responsive, and improves the overall user experience for those processes that involve end user input.

This data distribution process is used to distribute data objects to the network nodes where they are needed to support local processing and to manage this distributed data (and its updates) once it has been distributed. The collision detection and data synchronization mechanism defines the set of processes and methods used to track these distributed data objects and to manage changes to these distributed data objects throughout a network of intelligent computing devices ("network nodes").

Soft Object Referencing

Unlike the distributed application processes described above, soft object referencing describes a specific process that solves a specific problem inherent in distributed processing environments, including distributed application management. In order to distribute application components to support business transactions, the software must employ a process to determine what data and software are needed to support which transaction. Without this capability, the entire application and entire database would require replication to the computer supporting the business transaction, which would be cost-prohibitive and response-time prohibitive.

The system and method of the present invention addresses this issue by creating a new data type called the "Soft Object Reference." The term "object" is used to denote a portion of the business application that contains both data and application code, sometimes referred to as "methods." The term "object" as used herein below is intended to conform to the common use of this term within the computer software industry in such techniques as Object Oriented Development.

This soft object reference is established at design time and provides a logical boundary within the object graph that makes up the application object model. When a business transaction is initiated, it requests a target object on which it is to operate. The underlying software of the present invention traverses the object graph (starting from the requested object) and retrieves this object and all referenced objects until it reaches a soft reference. The soft references will then be transferred to the requesting device as a pointer only, and the traversing of the object graph stops at this point.

The business transaction then operates on the local objects and the soft referenced object pointers. Soft referenced objects will appear as if they were local objects to the business transaction. If the business transaction requires the actual object rather than the soft reference, this will be resolved transparently at run time by the underlying software by transporting the actual data object to replace the soft reference object. This will transport the next segment of the object graph to the requesting device until another soft reference is reached. In this manner, segments of the application are delivered on an as-needed basis to the requesting device that is executing a business transaction. This key innovation is fundamental to providing local application execution on devices with limited resource capabilities. Because on a network of computing devices there will exist a wide range of devices with a wide range of computational, communication and storage capabilities, from a large UNIX server down to a cell phone, the application must be able to be broken into pieces small enough to execute on the requesting device and small enough to transmit quickly over the network to the requesting device. Soft Object Referencing allows the logical segmentation of an application around business events so that requesting devices on a network can quickly access and execute these application segments. The unique method for segmenting applications and then manipulating these application segments provides an extremely efficient manner with which to determine what data and software are needed to support which transaction.

As discussed above, computing devices may be linked by a variety of private and public networks. User input, code, and data on which the code must operate may reside on different computer devices. To function effectively, these resources must be combined and the results of the work must be made available to the end user. While data and code may be distributed to the local computer devices, proper tracking and synchronizing of these transfers is essential for valid results. A system that distributes resources in an ineffective manner suffers from the same types of bottlenecks and poor performance that a system that performs all processing on a remote device. A useful data distribution scheme is essential to capitalize on the distributed processes.

System Operation

FIG. 1 illustrates system 100 that requires an efficient data distribution system with adequate collision detection and data synchronization to eliminate bottlenecks and other distribution and usage inefficiencies. The various components that make up the Distributed Object System 100 are listed and defined in the attached Glossary.

FIGS. 2A through 2H illustrate the basic operation of the collision detection and data synchronization mechanism in accordance with the present invention and help show the process flow that occurs and affects functional system 300 implementing synchronized distributed data/objects of the present invention. The functional system 300 is shown graphically in FIG. 3.

Object Retrieve: Local Computer Device (Client) Requests Data

Figure 2A:
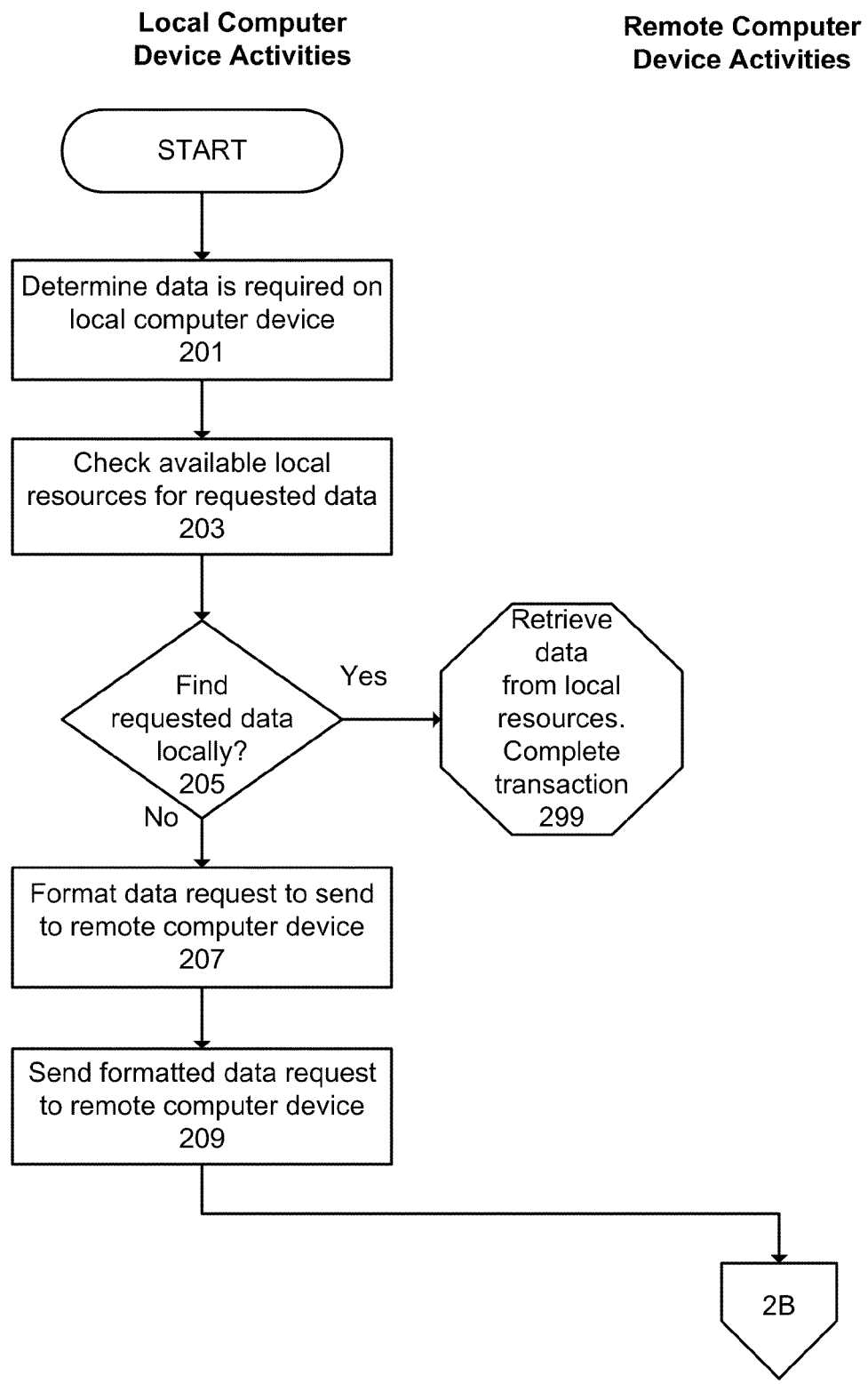
FIG. 2A is a process flow diagram illustrating the basic operation of the Local Computer Device Requesting Data in the Object Retrieve process of the present invention.

As shown in the process flow diagrams beginning with FIG. 2A, the first step in the collision detection and data synchronization mechanism is the request for data from a local computer device to a remote computer device. This would normally take place when a computer process running on the local computer device determines that it needs data to complete a task as shown at step 201. This necessary data may reside locally on the local computer device or remotely on another computer device. This data is requested within the bounds of what is referred to as a "transaction," which is defined as a logically grouped set of updates or data changes that must either all complete successfully, or none complete successfully.

A process running on the local device requests data to be used in a transaction. The local computer device checks local resources for the data required at step 203. This may include checking the local file system and the local in-memory data storage (known as a local data cache). If the required data is found locally at step 205, it is retrieved from the local file system or the main local data cache and used to complete the transaction at step 299.

If the needed data is not found on the local computer device, a request to a remote computer device ("server") is formatted at step 207 and sent to the server at step 209. In many cases, there will be one central server, which will contain a master copy of all data. Thus, if the needed data is not found on the local device, there is only one remote device that needs to be checked to locate the data. In more complex cases, the local computer device will need to check a directory of remote computer devices located on the local device to determine where the needed data is located, and then use the address provided by this directory to resolve to the proper remote computer device.

The request for data is formed using a data/object model that is duplicated between the local and remote computer devices. Thus, the syntax used to request the needed data is determined from this local model. The remote computer device uses an exact copy of this model to decode or interpret this request for data.

The request for data that is to be sent to the remote computer device is formatted for transport to the remote computer device in step 207. In the case of a browser-based application, for example, this would involve packaging the request as HTTP or HTTPS protocol.

Remote Computer Device (Server Side) Provides Data

Figure 2B:
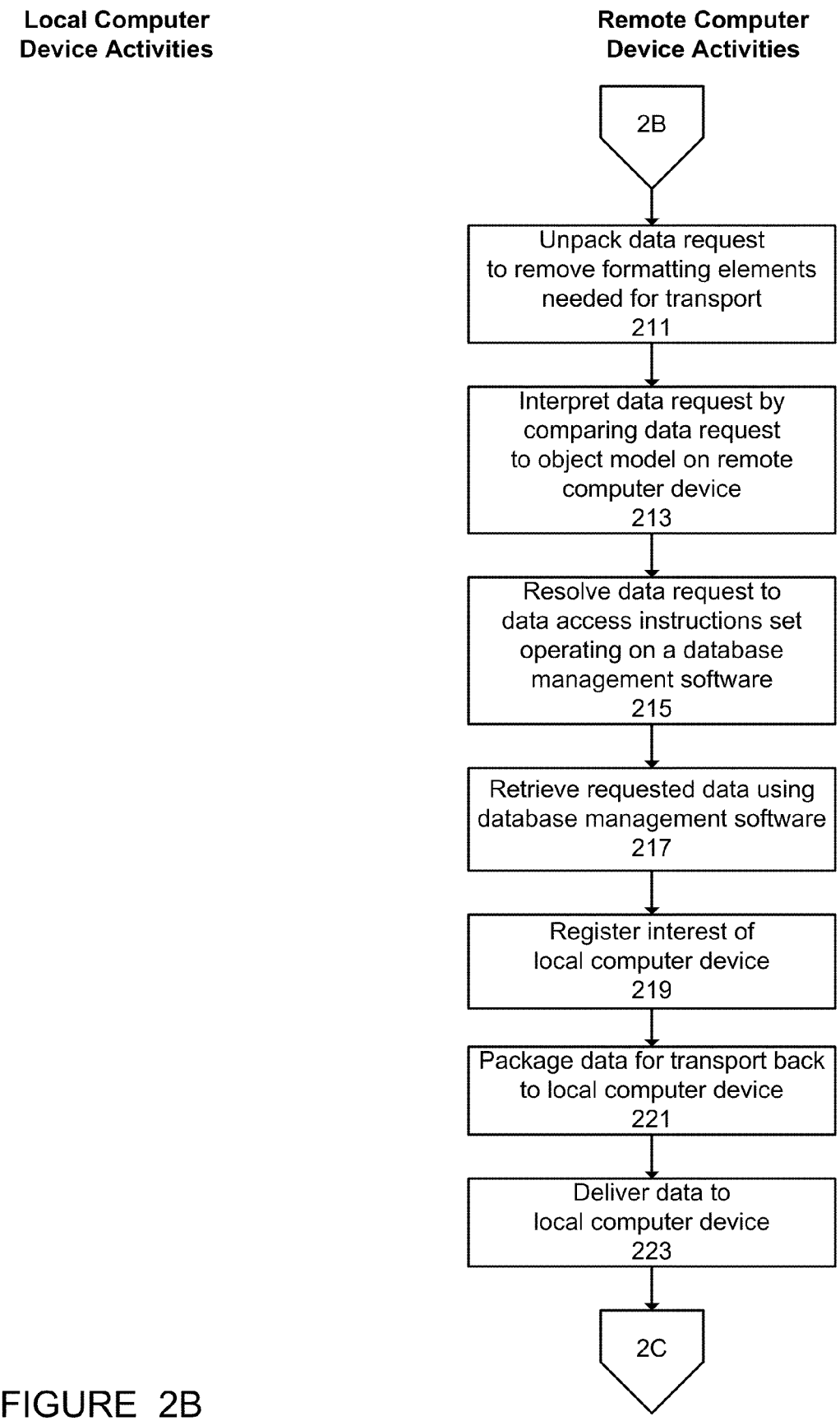
FIG. 2B is a process flow diagram illustrating the basic operation of the Remote Computer Device Providing Data in the Object Retrieve process of the present invention.

The remote computer device receives the request for data, and it is unpacked to remove the formatting elements needed for transport at step 211 in FIG. 2B. The request for data is then interpreted by comparing the data request to the data/object model on the remote computer device at step 213.

Once the request has been interpreted by comparison to the data/object model, the request is resolved to a set of data access instructions that operate on database management software (dBMS) at step 215. This data base management software (dBMS) is either running on the same computer device that received the data request, a computer device that is physically nearby to the computer device that received the data request, or a remote computer device connected via a network to the computer device receiving the request for data. Various known methods of resolving the request can be used.

At step 217, the requested data is retrieved from the database management software (dBMS). The remote computer device then registers the requesting local computer device's interest in the retrieved data or object in step 219. This registration of interest in the data retrieved by the local computer device is updated to persistent storage and is organized and indexed by the local computer device session ID and the data identifier(s) related to the data delivered to the local computer device. This persistent storage is referred to as the "Registration Table."

The data is then packaged for transport back to the local computer device in step 221, and in step 223, the data is delivered to the local computer device.

Local Computer Device Receives Requested Data

Figure 2C:
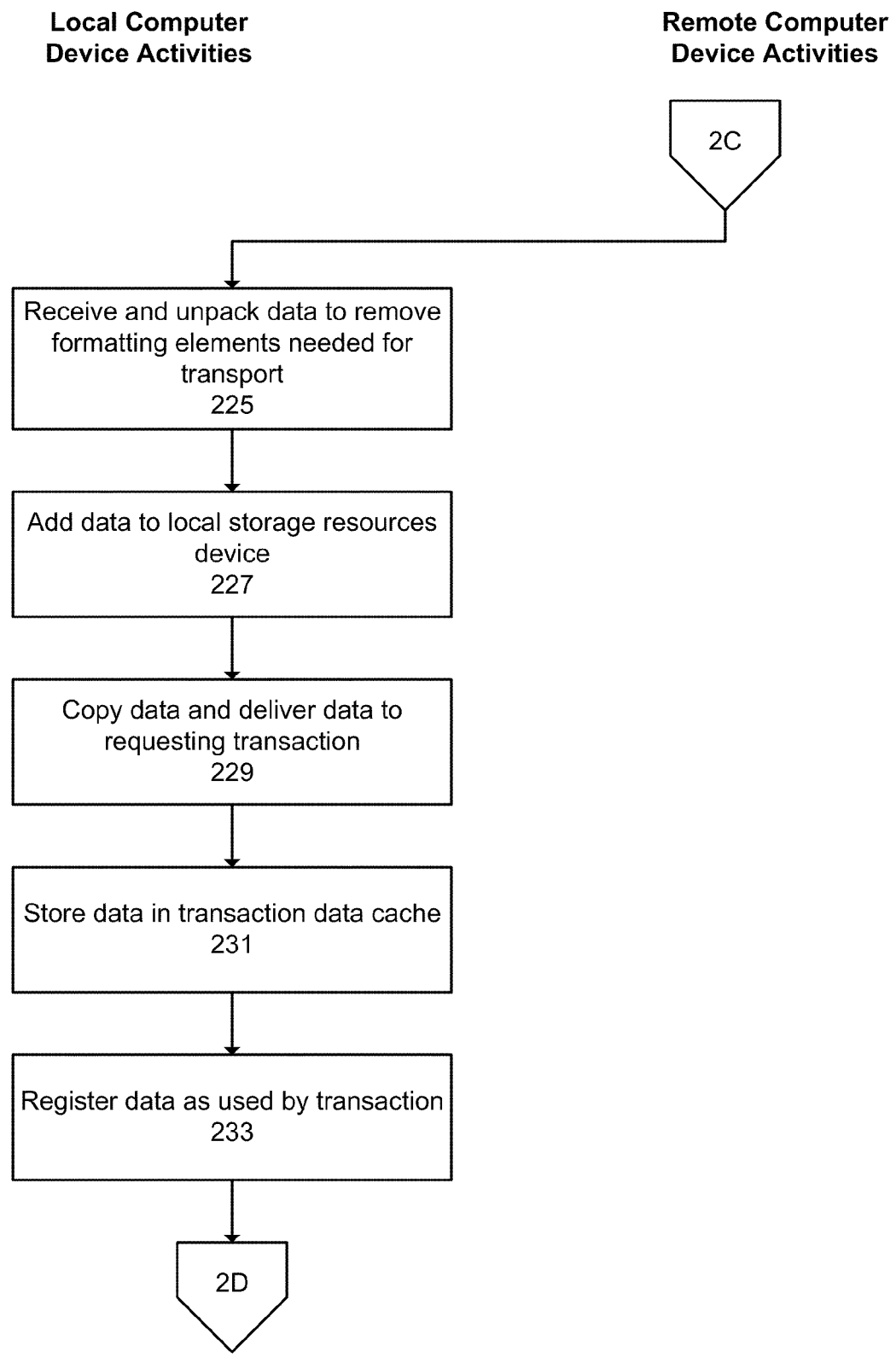
FIG. 2C is a process flow diagram illustrating the basic operation of the Local Computer Device Receiving the Requested Data in the Object Retrieve process of the present invention.
Figure 3:
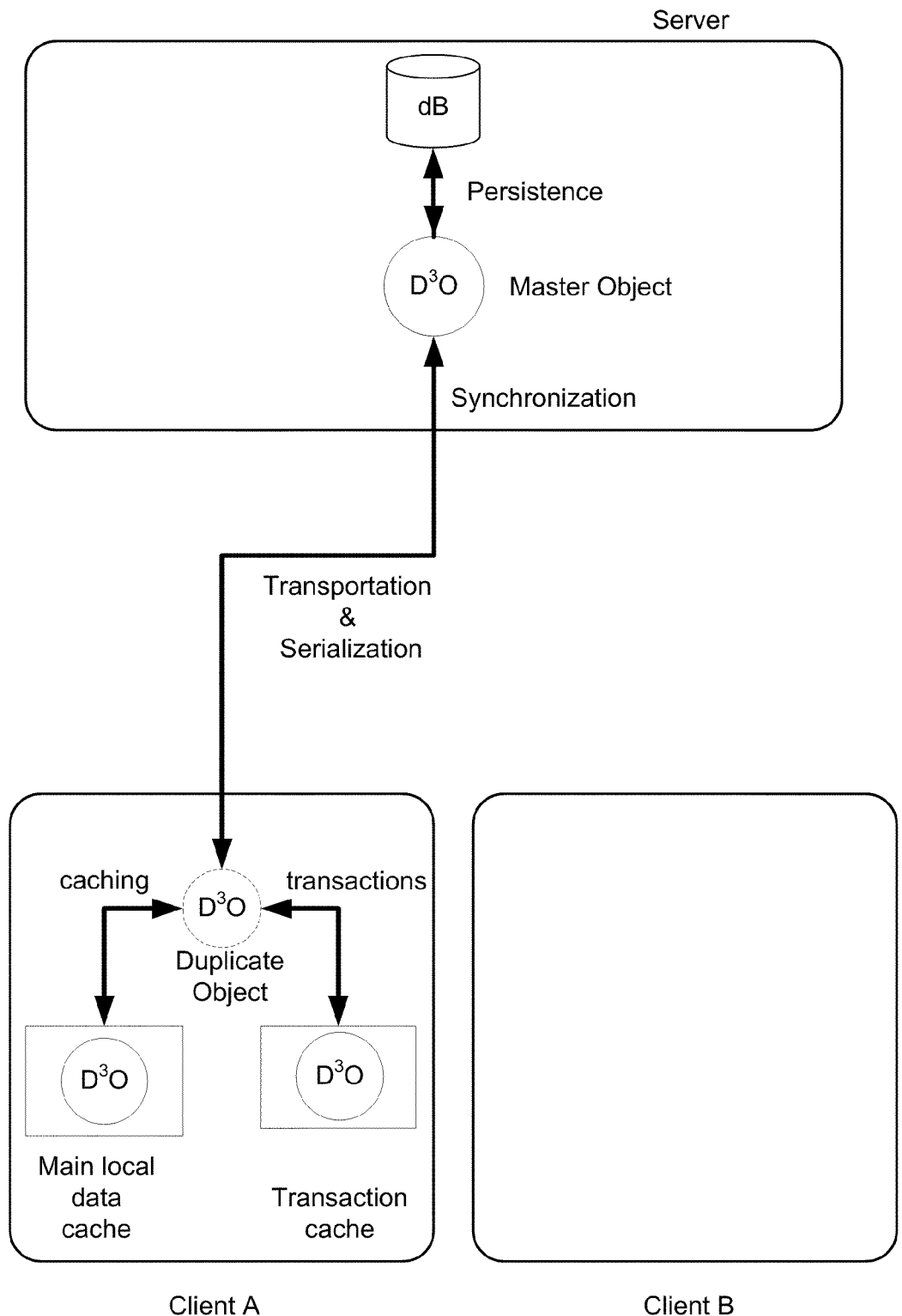
FIG. 3 is a schematic representation of the functional computer system network in accordance with the present invention.

In step 225 of FIG. 2C, the data is received by the local computer device and unpacked to remove elements needed for transport. In step 227, the delivered data is added to the local data storage resources-either an in-memory data cache or a local file system, for example. The data is then copied and delivered to the requested transaction in step 229. In step 231, the data is stored in a data cache used to support the transaction. The transaction data cache is separate from the main local data cache or main local data storage on the file system. At this point, the data exists on the remote computer device, the main local data cache or file system, and a transaction data cache as shown in FIG. 3.

Referring again to FIG. 2C, in step 233, the data is registered on the local computer device as used by the transaction.

Through the use of a conventional communication process, the remote computer device updates the main data cache to reflect changes that have been made to data by other processes or users. This communication process can be either a polling mechanism (described later under "Notification Mechanism-Pull Implementation") initiated by the local computer device, or a "push" communication process initiated by the remote computer device. These techniques are further described at the end of the process flow description.

Local Computer Device Updates the Data

Figure 2D:
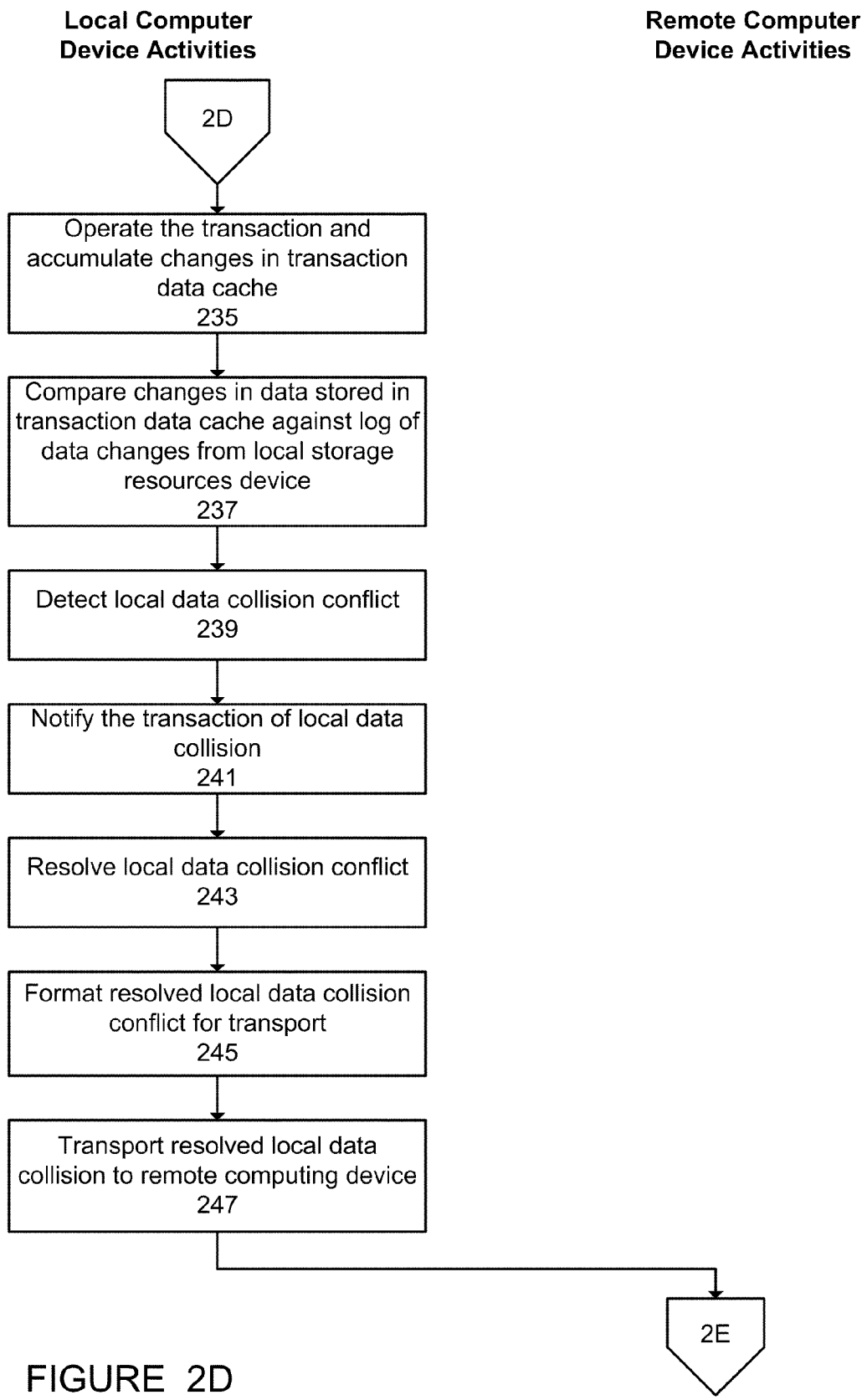
FIG. 2D is a process flow diagram illustrating the basic operation of the Local Computer Device Updating the Data process of the present invention.

The transaction operating on the local computer device makes changes to this data in step 235 as shown in FIG. 2D. These changes are accumulated in the transaction cache shown in the functional system diagram in FIG. 4.

Figure 4:
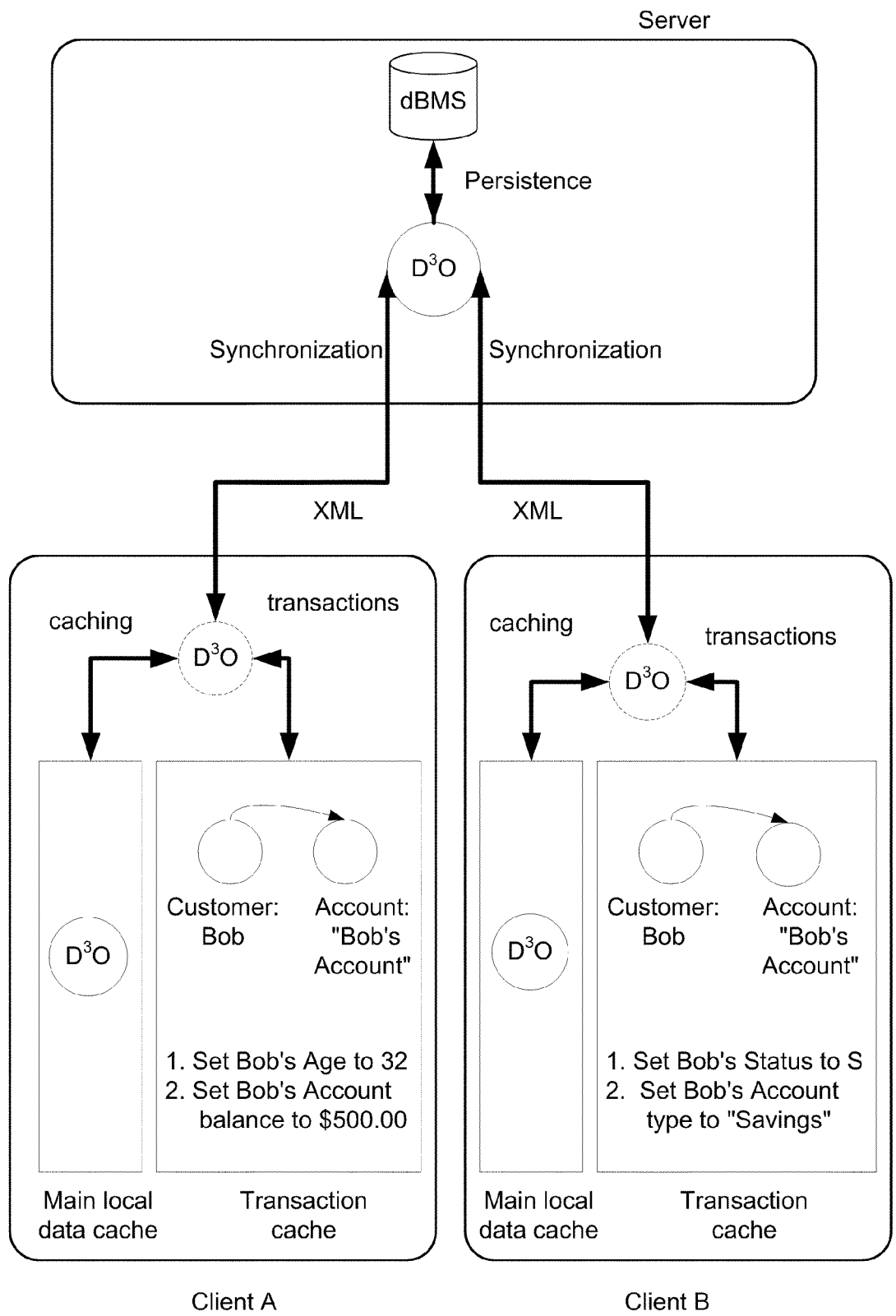
FIG. 4 is a schematic representation of the functional computer system network illustrating non-conflicting data changes in the transactional cache in accordance with the present invention

As shown in FIG. 4, the collision detection process of the present invention can differentiate between conflicting and non-conflicting changes made by multiple clients to the same data items. For example, in the system shown in FIG. 4, Client A begins Transaction A1 and receives Customer "Bob" from the Server. Client A sets Bob's age to 32. Client A then receives Bob's Account and sets Bob's Account balance to $500.00. Client A then commits Transaction A1. Client B begins Transaction B1. Client B then receives Customer "Bob" from the Server. Client B sets Bob's Status to "S." Client B the receives Bob's Account and sets Bob's Account type to "Savings." Client B then commits Transaction B1. The non-conflicting changes made by Client A and Client B are differentiated by the system and method of the present invention to avoid false detection of conflicting changes that would otherwise bottleneck the process. In this fashion, the same data item may be modified by multiple clients without a degradation in system performance.

When the transaction is completed, all changes accumulated in the transaction data cache are compared against a log of data changes to the main local data cache received since the remote data was retrieved. This process is performed in step 237 as shown in FIG. 2D. Each data change consists of a "before value," an "after value," and a date and time stamp for individual data items. Although there is no condition or restriction on the size (or granularity) of data changes that are tracked, the collision detection and data synchronization process of the present invention works best with the lowest functional level of granularity possible. This is typically performed at the object property or relational database column/field level.

If a change has been received by the local computer device from the remote computer device to a data item that was also changed by the transaction running on the local computer device, then a local data collision is detected in step 239, and the transaction running on the local computer device is notified both that the conflict has occurred and also is notified of the conflicting values of the data item in step 241. The local transaction must then handle this conflict in an application specific manner as shown in step 243.

If no conflicts are detected on the local computer device, then the changes to the data are submitted to the proper remote computer device(s) for remote conflict checking and long-term persistence. The data changes that are sent to the remote computer device are formatted for transport to the remote computer device in step 245 and then sent in step 247. In the case of a browser-based application, this would involve packaging the request as HTTP or HTTPS protocol.

Remote Computer Device Updates the Data

Figure 2E:
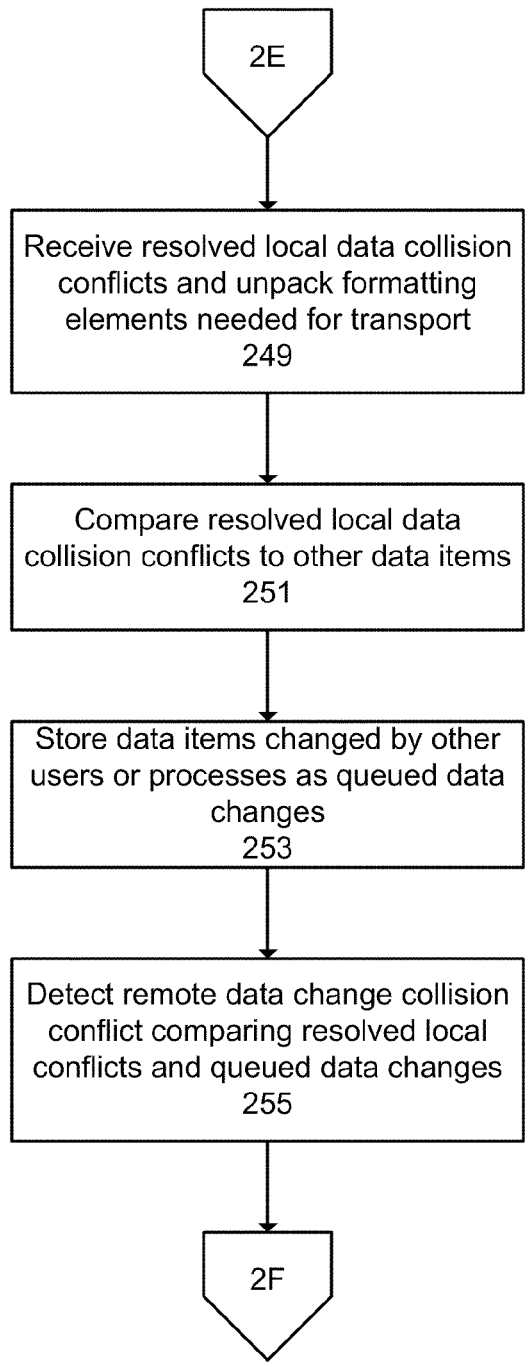
FIGS. 2E-2G are process flow diagrams illustrating the basic operation of the Remote Computer Device Updating the Data process of the present invention.
Figure 2F:
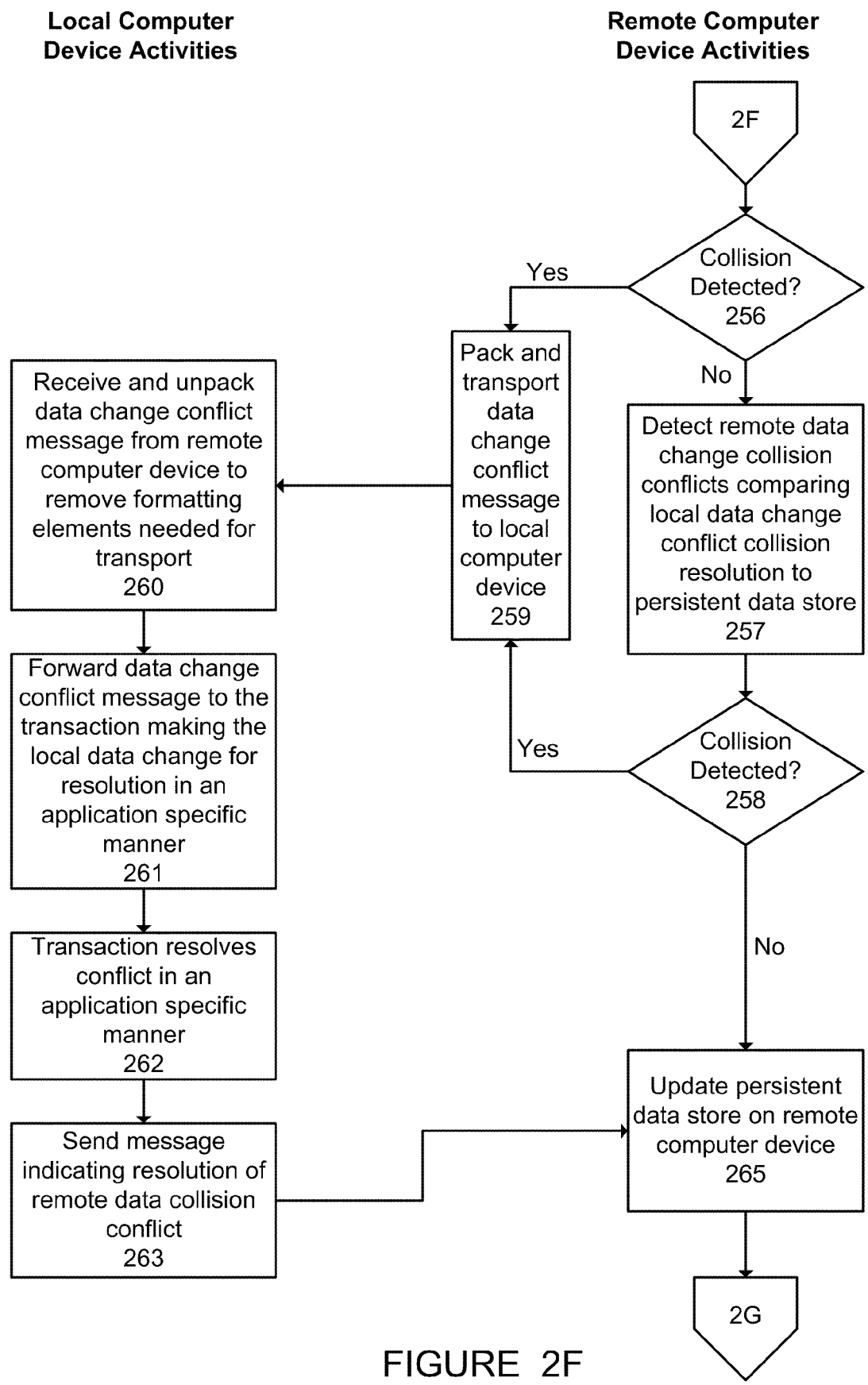

As shown in step 249 in FIG. 2E, the remote computer device receives the data changes resulting from the local conflicts resolution and unpacks them to remove the elements added to support their transport to the server. In step 251, the remote computer device then retrieves changes made by other users or other automated processes to the data items changed by the transaction at the local computer device, that were to be delivered to the main data cache/store on the local computer device, but which have not yet been sent to the local computer device. These are "queued data changes" that are waiting for the next polling interval or push transaction to update the local computer device main data cache/store. These queued data items are then stored in step 253 for comparison purposes.

In step 255, collision detection is performed on the data based on a comparison of the local data collision conflict resolutions and the queued data changes. If a collision is found with these queued data changes in step 256 of FIG. 2F, a data change conflict message is sent to the local computer device in step 259. This data change conflict message is packed by the remote computer device for transport and received and unpacked by the local computer device in the same manner as other messages between computer devices. After it is received and unpacked by the local computer device in step 260, in step 261 it is forwarded to the transaction making the local data change for resolution in an application-specific manner.

If no data collision is detected with the queued data changes in step 256, then in step 257, the remote computer device then checks the persistent data store to match the old value of the data change to the value stored on the persistent data store.

If the old value on the data change does not match the value on the persistent data store in step 258, a data change conflict message is sent to the local computer device in step 259. This message is packed by the remote computer device for transport and unpacked by the local computer device in the same manner as other messages between computer devices. It is then received by the local computer device as in step 260 and forwarded to the transaction making the local data change for resolution in an application-specific manner as in step 261. Once the remote data collision conflict is resolved in step 262, the local computer device, in step 263, sends a notification message to the remote computer device indicating resolution of the remote data collision conflict. Once the conflict is resolved and the remote computer device is notified of the resolution, the persistent data store on the remote computer device is updated in step 265.

If value of the data change and the value stored on the persistent data store matches in step 258, then there is no data conflict, no collision is detected, and the data change is made to the persistent data store as in step 265.

Figure 2G:
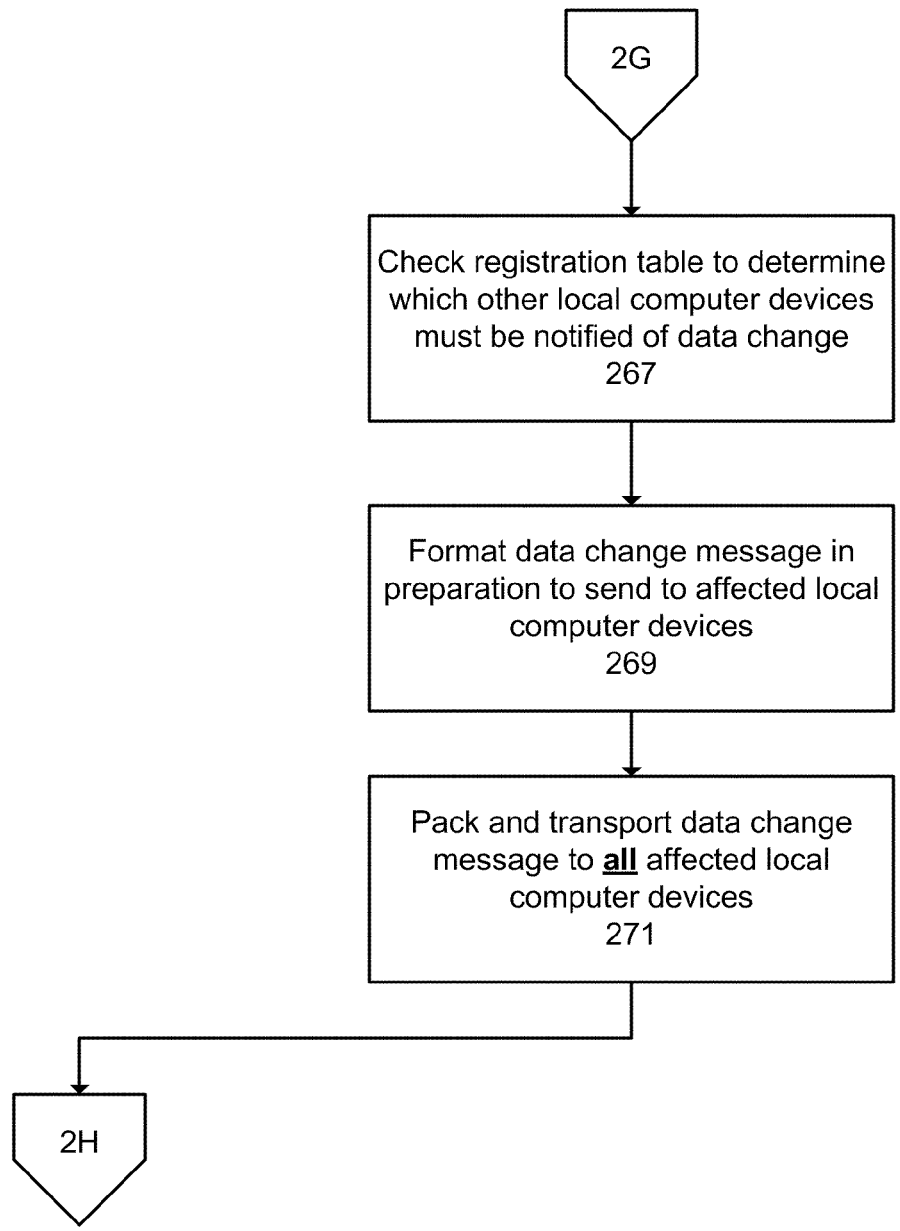
Figure 2H:
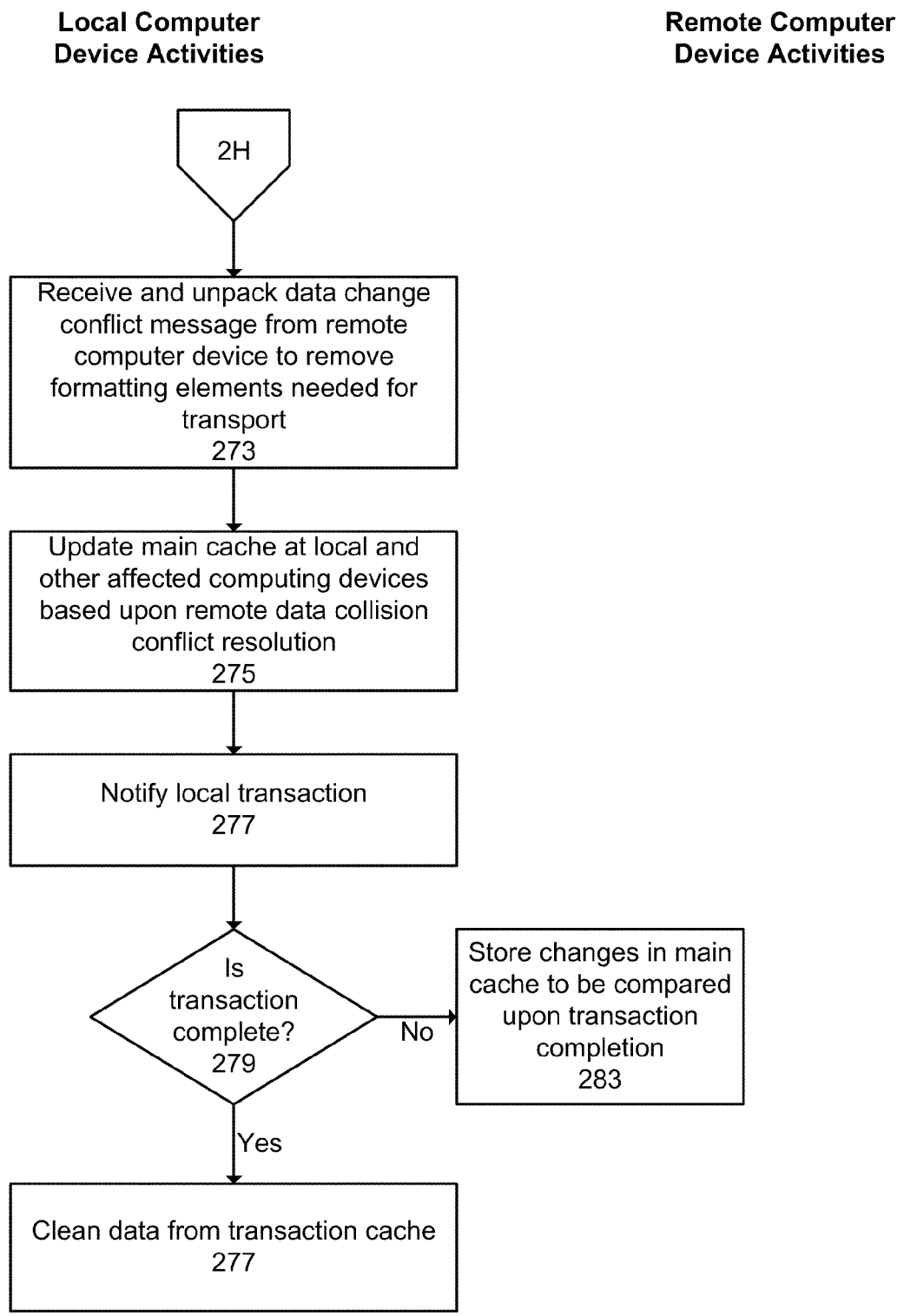
FIG. 2H is a process flow diagram illustrating the basic operation of the Local Computer Device Completing the Data Update process in accordance with the present invention.

As shown in FIG. 2G, the remote computer device then checks the registration table in step 267 to determine which other local computer devices must be notified of this data change. In step 269, the remote computer device then formats the data change messages that are to be sent from the remote computer device to all other local computer devices that have registered interest in the data item. In step 271, these messages are packed for transportation and either sent to the affected local computer devices immediately in a push model of communication, or queued for the next polling message in a polling model of communication.

In step 271, the local computer device originating the data change is then notified of a successful data change update in a response message to the original request for data change message.

Local Computer Device Completes the Data Update Process

In step 273, the local computer device receives a message indicated the data change update process has completed successfully. It unpacks the message to remove the elements added to allow transport and then processes the message.

In processing the message in step 275, the local computer device first updates the main data cache on the local computer device to reflect the new value of the data item(s). The local transaction is notified in step 277, and if the transaction is complete in step 279, the local transaction cache is cleaned (the data changes within it are deleted) in step 281.

If the transaction is not complete, that is, the same object is used by another transaction on the client, the changes are stored in the main cache in step 283 to be compared upon transaction completion.

Notification Mechanism

Figure 5:
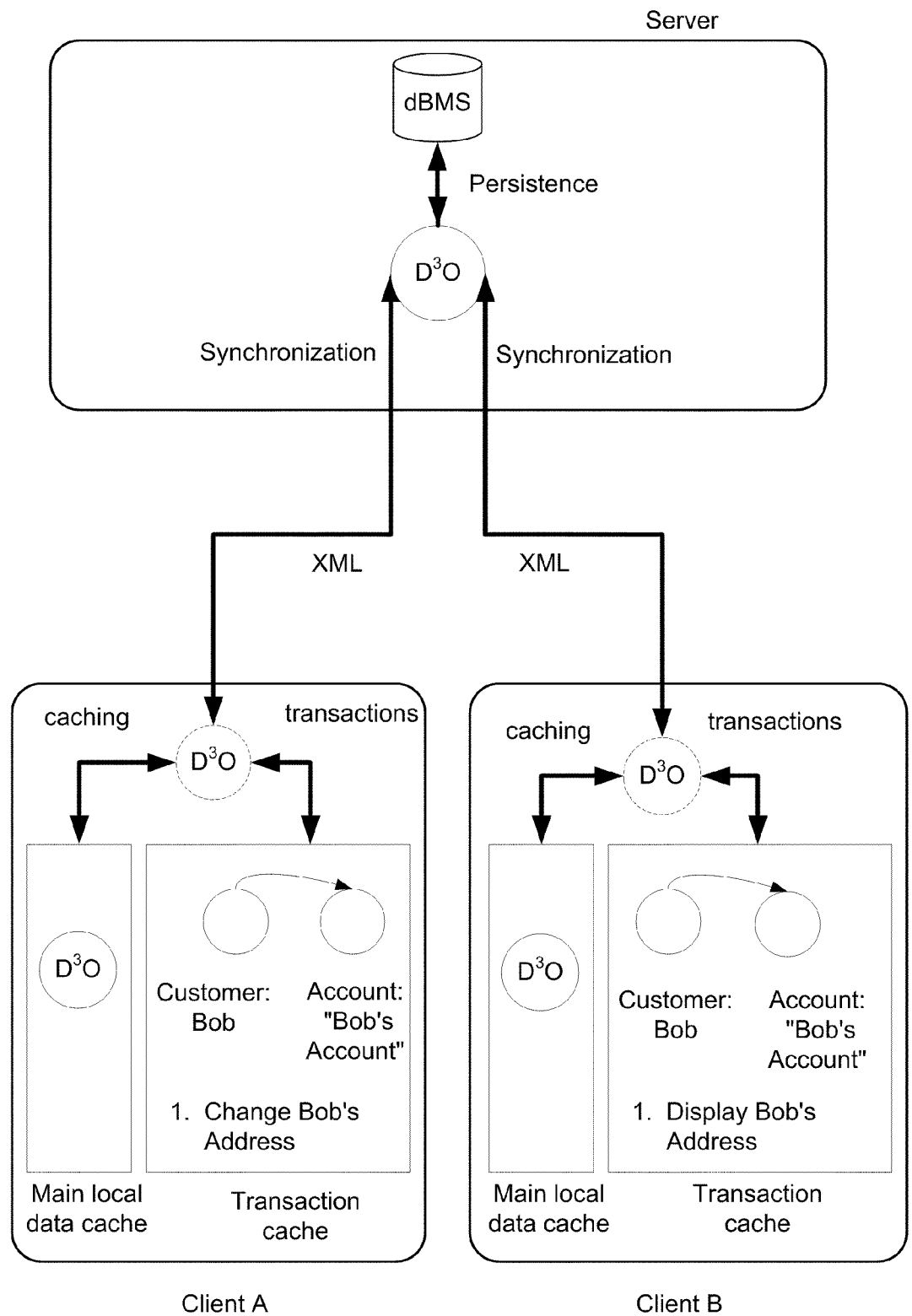
FIG. 5 is a schematic representation of the functional computer system network illustrating near real-time updates of data changes in the transactional cache in accordance with the present invention.

As shown in FIG. 5, the collision detection process of the present invention also provides near real-time notification of changes made to locally cached data. For example, in the system shown in FIG. 5, Client A receives the Customer "Bob" object from the Server. Client B then receives Customer "Bob" from the Server. Client A changes Bob's address and commits the change, i.e. accomplishes a data commit to update the database. Client B then displays customer Bob's address. Client B is notified in near real-time of the changes made to Bob's address. The system and method of the present invention ensures that the changes made by Client A will be transparently applied to Client B's previously cached version of the data object.

a. "Pull" Implementation: Local Computer Device Initiates Synchronization

As outlined above with regard to the method of the present invention, periodically requests are sent to the remote computer device to retrieve data changes for data stored in the local computer device main data cache (as well as data used in local computer device transactions). These "notification requests" are the primary communication mechanism used to synchronize the data on the local and remote computer devices.

These requests are initiated by the local computer device on a regular interval and, in the case of communication over the Internet between local and remote computer devices, require no special network configuration or firewall configuration to receive inbound responses to these messages. These requests serve a number of functions beyond transporting data changes to synchronize local and remote computer devices, including maintaining a "heartbeat" between the two devices used to detect failures at either the local or remote computer device. The requests can also be used to transport text messages between local computer devices that are attached to a common remote computer device. This can be very useful in understanding and resolving data conflicts that may arise.

These request messages are packed for transportation in a manner appropriate to the network and communication protocol employed.

Remote Computer Device Processes Synchronization

The remote computer device receives the update request and unpacks it to remove elements added to support transportation across the network connecting the local and remote computer devices. The remote computer device then checks a resource that maintains the queue of all data changes that are relevant to the local computer device. This resource is referred to as a "mailbox" and is a queue that contains all data changes and other information, such as text messages, that should be delivered to the local computer device. The mailbox will typically contain whatever data changes have take place successfully against pieces of data that are registered to the particular local computer device since the last notification message.

If data changes are found, they are retrieved and formatted for transport to the local computer device and then sent to that device as a response to the notification message received from the local computer device.

Local Computer Device Processes Synchronization Response

The notification message is received by the local computer device and unpacked to remove the transportation elements. If data changes have been sent along with the notification message, these data changes are applied to the corresponding data items in the main data cache.

If there are any transactions in process on the local computer device, the data changes received from the notification message are stored on the local computer device and used to compare with data changes made by the transactions in process, at such time as the transactions are completed. This process of the local computer device updating the data is described above in the Data/Object Update section.

b. "Push" Implementation

In addition to the notification mechanism utilizing a pull implementation, the method of the present invention may also be achieved using a push implementation. In this scenario, Client B is also notified in near-real-time of the changes made to Bob's address, and the changes are transparently applied to Client B's previously cached version of the data object. The remote computer device processes a data change to a data item that is registered to a number of local computer devices.

The remote computer device then constructs a data change message that is sent to the impacted local computer devices immediately, without queuing in a mailbox. The local computer device then processes the data change message in the manner described above with regard to the local computer processing the synchronization response.

Mail Box for "Pull" Implementation

There is one mailbox resident on a remote computer device for each user or for each automated process where there is no end-user. Typically, in the case of a single user computer device such as a personal computer, each local computer device will maintain one session at a time. However, the Collision Detection and Data Synchronization Mechanism of the present invention may also connect computer devices that are multi-user or multi-session devices at both the local and remote computer device nodes. In this case, each unique session on the local computer device will have a corresponding session ID to uniquely identify messages within the mailbox on the remote computer device.

The definition of what constitutes a session is application-specific. However, it is generally understood to be a grouping of transactions over a defined time period that are processed serially. Sessions can be user-based, with a session start process such as a log on, allocate resources, and the like and a session end process such as a log off, de-allocate resources, and the like, with application-specific transactions between the start and end of the session. The session also may be a batch of transactions processed in an automated process from computer device to computer device. Additionally, a session could be defined as one transaction with a unique mailbox for each session/transaction. Additional transaction scenarios may also be implemented.

Each mailbox collects all notification information related to all session opened by the local computer device with the remote computer device. The mailbox may be stored in memory (in a cache on the remote computer device). However, in order to maintain the integrity of the overall application in the event of a failure at either the local or remote computer devices, the data stored in the mailbox at any time can be recreated from the Registration Table as well as session information on the local computer device. Any session information can be stored locally to enable the local computer device to recreate the session and the state of the session. For example, the local device can store a list of all objects used during a session.

In the preferred embodiments, a data set is transferred form the remote computing device to the local computing device for transaction processing. While the preferred embodiments utilize a client server architecture, the invention can be used in a multi-tiered configuration in which the remote computing device is a computer at a level above the local computing device. The methods and structures of the preferred embodiments can be accomplished across the various tiers of an n-tier architecture.

GLOSSARY

Business Transaction—a meaningful unit of work in accomplishing a business process.

Collision—a situation where two or more independent processes attempt to update a data item with different values without the context that the other processes are attempting to update this data item.

Collision Detection—ensure client B does not successfully commit its transaction before becoming aware that a conflicting change has been committed by client A Computer Device—Any device with computational capability or the ability to execute computer instructions.

Database Management System—a software product used to organize and retrieve data from a data store or data cache.

Data Cache—an in memory storage area on a Computer Device which can contain either computer instructions or data. A data cache is generally understood to be "volatile" in that it will not persist if the computer device is turned off.

Data Commit—an indication that a data change is confirmed and should be made available for further processing.

Data Model/Object Model—a description of the valid data elements and the acceptable and mandatory relationships between these data elements. When referring to the structure of data in a relational data format, convention is to use the term data model. When referring to the structure of data in an object oriented format, convention is to use the term object model.

Data Store—a persistent memory storage area on a computer device which can contain either computer instructions or data. A data store is generally understood to be "non-volatile" in that the information it contains will persist when the computer device is turned off.

Distributed Duplicated Data Objects ($D^3O$)—by distributing a copy of objects to a client side cache, rich-clients can interact with local data and methods to provide near-instant response time. Changes to object properties are reported and reconciled to the server through standard messages. The server is unburdened from all presentation logic and all transaction management save the persistence of completed transactions.

Encapsulation (see also Transaction Isolation)—ensure data available to transaction B is isolated from the changes being made to the same data in transaction A.

Heartbeat—A periodic synchronization or interrupt signal used by software to demonstrate that it is still alive.

Local Computer Device—Any device with computational capability on which a unit of work is initiated requiring computer instructions (in the form of software code and/or end user input) and data on which the computer instructions operate.

Mail Box—a queue used to store data changes and other information to be sent from a remote computer device to a local computer device.

Network—Two or more computer devices connected with a communication medium such as the Internet or a local area network. The computer devices may be connected on either a wired infrastructure or a wireless infrastructure. The connection may be either periodic or continuous.

Network Node—a computer device connected to a network. This computer device may or may not have user input and display capability (such as that found on a personal computer). It may have only sensors and very limited state and computational capability (such as the motion detector device on a facility alarm system.)

Notification Message—a message sent between a local computer device and a remote computer device facilitate the transport of data changes between the local and remote computer devices.

Pull Mechanism—Notification messages that are initiated by the local computer device on a periodic basis The pull mechanism is compatible with current Internet protocols (HTTP/HTTPS).

Push Mechanism—Notification messages that are initiated by the remote computer device on an event driven basis (when a data change occurs that must be sent to a local computer device). The push mechanism is not compatible with current HTTP/HTTPS protocols that drive most Internet traffic and thus requires a special protocol.

Registration Tables—A persistent data storage area that records which local computer devices contain what elements of data that requires synchronization.

Remote Computer Device—Any device with computational capability that can be connected to the Local Computer Device through any network, public or private. The Remote Computer Device could be immediately adjacent to the Local Computer Device or thousands of miles away. The concept of local and remote are relative to a particular unit of work. Thus a particular computer device can function as both a local and remote computer device for different units of work.

Shared Data Architecture (see also Soft Object Reference)—instead of centralized data, the data is shared on demand. Data is distributed by the server based on the operational need.

Soft Object Reference—a process to determine what data and software are needed to support which transaction at which computer device.

Transaction—a logically grouped set of changes to data that must all be processed or none must be processed.

Transaction Data Set—The set of data potentially involved in a transaction

Transaction Isolation (see also Encapsulation)—ensure data available to transaction B is isolated from the changes being made to the same data in transaction A.

User—an individual person accessing a software application

While the present invention have been described in connection with a number of exemplary embodiments and implementations, the present invention is not so limited but rather covers various modifications and equivalent arrangements, which fall within the purview of the appended claims.

What is claimed is:

1. A method of implementing synchronized distributed objects comprising:
   a local computing device requests data from a remote computing device to be used in a transaction;
   the local computing device checks local resources for the data required;
   upon failing to locate the required data locally, the local computing device formats a request for the required data to the remote computing device;
   the local computing device sends the formatted request to the remote computing device;
   the remote computing device receives the formatted request and unpacks the formatted request to remove formatting elements needed for transport;
   the remote computing device interprets the formatted request from the local computing device by comparing the formatted request to an object model on the remote computing device;
   the remote computing device resolves the formatted request to a set of data access instructions that operate on database management software;
   the database management software retrieves the requested data;
   the remote computing device registers interest in the retrieved data by the local computing device that requested the data;
   the remote computing device packages the retrieved data for transport to the local computing device;
   the remote computing device delivers the retrieved data to the local computing device;
   the local computing device receives the retrieved data and unpacks the formatted request to remove formatting elements needed for transport;
   the local computing device adds the retrieved data to a local data storage resources device;
   the local computing device copies the retrieved data and delivers the retrieved data to the transaction;
   the local computing device stores the retrieved data in a transaction data cache used to support the transaction, the transaction data cache being separate from a main local data cache and separate from a main local data mass storage area;
   the local computing device registers the data as used by the transaction;
   the local data storage resources device is updated to reflect changes made at the remote computing device by other users or by automated processes;
   the local computing device operates the transaction, thereby accumulating changes in the data stored in the transaction data cache;
   the changes in the data stored in the transaction data cache are compared against a log of data changes to the local data storage resources device after retrieving remote data;
   the local computing device detects a local data collision conflict based upon the comparison of the data stored in the transaction data cache and the local data storage resources device;
   the local computing device notifies the transaction that the local data collision conflict occurred;
   the transaction resolves the local data collision conflict in an application-specific manner;
   the local computing device formats the resolved local data collision conflict for transport to the remote computing device;
   the local computing device transports the resolved local data collision conflict to the remote computing device for remote data conflict checking and long-term persistence;
   the remote computing device receives the resolved local data collision conflict and unpacks formatting elements added for transport;
   the remote computing device compares the resolved local data collision conflict to data items changed by the other users or by the automated processes;
   the remote computing device stores the data items changed by the other users or by the automated processes as queued data changes;

the remote computing device detects a remote data change collision conflict based upon the comparison of the resolved local data collision conflict and the queued data changes;
the remote computing device notifies the local computing device that the remote data change collision conflict occurred;
the local computing device forwards the notification to the transaction for resolution in the application-specific manner and sends a message to the remote computing device indicating resolution of the remote data change collision conflict;
the remote computing device then detects a remote database collision conflict based upon comparison of the results of the resolved local data collision conflict and a persistent data store on the remote computing device;
the remote computing device notifies the local computing device that the remote database collision conflict occurred;
the local computing device forwards the notification to the transaction for resolution in the application-specific manner and sends a message to the remote computing device indicating resolution of the remote database collision conflict;
the remote computing device updates the persistent data store on the remote computing device;
the remote computing device checks a registration table to determine other computing devices that must be notified of the resolution of the remote database collision conflict performed by the local computing device and the remote computing device;
the remote computing device transmits the results of the resolution of the remote database collision conflict to the local computing device and other computing devices affected by the remote database collision conflict;
the local computing device and the other computing devices update the main local data cache based upon the resolution of the remote database collision conflict; and
the local computing device purges data from the transaction data cache.

2. A method of implementing synchronized distributed objects comprising:
requesting data from a remote computing device to be delivered to a local computing device that initiated the request, the requested data to be used in a transaction;
checking local resources available to the local computing device for the data required;
formatting a data request to the remote computing device from the local computing device upon failing to locate the required data locally;
sending the data request from the local computing device to the remote computing device;
receiving the formatted data request at the remote computing device and unpacking the formatted data request to remove formatting elements needed for transport;
interpreting the formatted data request using the remote computing device to compare the formatted data request to an object model on the remote computing device;
resolving the data request to a set of data access instructions that operate on database management software;
retrieving the requested data using the database management software as a retrieval tool;
registering interest of the local computing device that requested the retrieved data;
packaging the retrieved data for transport from the remote computing device to the local computing device;
delivering the retrieved data to the local computing device;
receiving the retrieved data at the local computing device and unpacking the retrieved data to remove formatting elements needed for transport;
adding the retrieved data to a local storage resources device available to the local computing device;
copying the retrieved data and delivering the retrieved data to the transaction;
storing the retrieved data in a transaction data cache used to support the transaction, the local computing device storing the retrieved data, and the transaction data cache being separate from a main local data cache and separate from a main local data mass storage area;
registering the retrieved data as used by the transaction;
operating the transaction, thereby accumulating changes in the data stored in the transaction data cache;
comparing the changes in the data stored in the transaction data cache against a log of data changes to the local storage resources device after retrieving data from the remote computing device;
detecting a local data collision conflict by using the local computing device to compare the data stored in the transaction data cache and the local storage resources device;
notifying the transaction that the local data collision conflict occurred;
resolving the local data collision conflict utilizing the transaction to resolve the local data collision conflict in an application-specific manner;
formatting the resolved local data collision conflict for transport from the local computing device to the remote computing device;
transporting the formatted resolved local data collision conflict from the local computing device to the remote computing device for remote data conflict checking and long-term persistence;
receiving the formatted resolved local data collision conflict at the remote computing device and unpacking formatting elements that were added for transport;
comparing the formatted resolved local data collision conflict to data items changed by other users or by automated processes;
storing the data items changed by the other users or by the automated processes as queued data changes;
detecting a remote data change collision conflict by using the remote computing device to compare the formatted resolved local data collision conflicts and the queued data changes;
detecting a remote database collision conflict by using the remote computing device to compare the resolved local data collision conflict to a persistent data store;
sending notification of a remote database collision conflict from the remote computing device to the local computing device;
forwarding the notification from the local computing device to the transaction for resolution of the remote database collision conflict in the application-specific manner;
sending a message from the local computing device to the remote computing device indicating resolution of the remote database collision conflict;
updating the persistent data store on the remote computing device;
checking a registration table available to the remote computing device to determine if other computing devices must be notified of the resolution of the remote database collision conflict performed by the local computing device;

transmitting the results of the resolution of the remote database collision conflict from the remote computing device to the local computing device and to other computing devices affected by the remote database collision conflict;

updating the main local data cache at the local computing device and the other computing devices based upon the resolution of the remote database collision conflict; and cleaning data from the transaction data cache at the local computing device.

3. The method of implementing synchronized distributed objects of claim 2, where the step of checking local resources further comprises checking a local file system.

4. The method of implementing synchronized distributed objects of claim 3, where the step of checking the local resources further comprises checking a local data cache.

5. The method of implementing synchronized distributed objects of claim 3, where the step of requesting data from the remote computing device further comprising checking multiple remote devices to locate the data.

6. The method of implementing synchronized distributed objects of claim 5, further comprising checking a directory of multiple remote devices to locate the data and using an address provided by the directory to resolve to the remote computing device containing the data.

7. The method of implementing synchronized distributed objects of claim 2, wherein the request for data from the remote computing device is formed using a data model and an object model that is duplicated between the local computing device and the remote computing device thereby employing the syntax determined from the duplicated data model and the duplicated object model on the local computing device to request the needed data, and wherein the remote computing device uses an exact copy of the duplicated data model and the duplicated object model on the local computing device to interpret the request for data.

8. The method of implementing synchronized distributed objects of claim 2, wherein the database management software resides on the same computing device that received the data request.

9. The method of implementing synchronized distributed objects of claim 2, wherein the database management software resides on a second remote computing device connected to the remote computing device receiving the data request.

10. The method of implementing synchronized distributed objects of claim 2, wherein registering the interest of the local computing device further comprises updating a registration of interest in the retrieved data by the local computing device to the persistent data store.

11. The method of implementing synchronized distributed objects of claim 10, wherein the step of updating the registering the interest to the persistent data store further comprises indexing by a local computing device session identifier and a data identifier related to the data delivered to the local computing device.

12. The method of implementing synchronized distributed objects of claim 2, wherein the local storage resources device is a memory data cache.

13. The method of implementing synchronized distributed objects of claim 2, wherein the local storage resources device is a local file system.

14. The method of implementing synchronized distributed objects of claim 2, wherein the log of data changes to the local storage resources device after retrieving the remote data comprises a before value, an after value, and a date and time stamp for individual data items.

15. The method of implementing synchronized distributed objects of claim 2, wherein the step of notifying the transaction that the local data collision conflict occurred further comprises the local computing device notifying the transaction of conflicting values of the data item.

\* \* \* \* \*